United States Patent [19]

Chaffanjon et al.

[11] Patent Number: 5,594,097
[45] Date of Patent: Jan. 14, 1997

[54] POLYETHER POLYOLS

[75] Inventors: Pierre G. Chaffanjon, Tervuren; Peter F. Stroobants, Ham; Gerhard J. Bleys, Heverlee, all of Belgium

[73] Assignee: Imperial Chemical Industries PLC, London, United Kingdom

[21] Appl. No.: 472,204

[22] Filed: Jun. 7, 1995

Related U.S. Application Data

[60] Division of Ser. No. 190,518, Feb. 1, 1994, which is a continuation-in-part of Ser. No. 64,190, May 17, 1993, abandoned.

[30] Foreign Application Priority Data

Feb. 2, 1993 [GB] United Kingdom .................. 9301995

[51] Int. Cl.$^6$ .............. C08G 65/04; C07C 41/00
[52] U.S. Cl. .............. 528/419; 252/182.26; 252/182.27; 521/125; 521/160; 521/174; 521/176; 521/914; 528/67; 528/68; 528/76; 528/77; 568/602

[58] Field of Search ................... 521/125, 160, 521/174, 176, 914; 528/67, 68, 76, 77, 419; 252/182.26, 182.27; 568/602

[56] References Cited

U.S. PATENT DOCUMENTS

| | | | |
|---|---|---|---|
| 4,478,960 | 10/1984 | Buethe et al. | 521/160 |
| 4,997,858 | 3/1991 | Jourquin et al. | 521/118 |
| 5,043,360 | 8/1991 | Pham et al. | 521/159 |

Primary Examiner—Shelley A. Dodson

[57] ABSTRACT

Polyether polyol comprising as alkylene oxide units ethylene oxide and propylene oxide units, said polyol having a nominal average hydroxyl functionality of 2–6, an hydroxyl value of 16–45 mg KOH/g, a primary hydroxyl content of at least 50% calculated on the total amount of hydroxyl groups and an amount of ethylene oxide units, calculated on the weight of the alkylene oxide units in the polyol, of 21–49% by weight these polyols are useful for making flexible foam.

2 Claims, No Drawings

POLYETHER POLYOLS

CROSS REFERENCE TO RELATED APPLICATIONS

The present application is a divisional of U.S. patent application Ser. No. 08/190,518, filed Feb. 1, 1994 which is a continuation-in-part of abandoned U.S. patent application Ser. No. 08/064,190, filed May 17, 1993.

The present invention is concerned with a novel polyol and a process for preparing a flexible polyurethane foam, from a special class of polyols.

The use of certain polyols for preparing flexible polyurethane foams is widely known and has e.g. been disclosed in EP 309217, 309218, 353785, 353786, 433878 and 296449.

Surprisingly it has been found that by using a special polyol under special conditions the processing and the properties of flexible polyurethane foams may be further improved. Further a novel polyol within the class of special polyols mentioned above was made.

The present invention is concerned with a polyether polyol comprising as alkylene oxide units ethylene oxide units and propylene oxide units, the polyol having a nominal average hydroxyl functionality of 2–6, preferably 2–4, most preferably 3, an hydroxyl value of 16–45 mg KOH/g, preferably 16–40 mg KOH/g, wherein the amount of primary hydroxyl groups calculated on the total amount of hydroxyl groups is at least 50% and the amount of ethylene oxide units calculated on the weight of the alkylene oxide units in the polyol is 21–49 and preferably 21–35% by weight and which polyol has been prepared by reacting an initiator and an amount of propylene oxide equivalent to 20–75% by weight of propylene oxide units calculated on the total amount of alkylene oxide units in the final polyol, followed by reaction of the polyol so obtained with a mixture of ethylene oxide and propylene oxide, followed by reaction of the polyol so obtained with an amount of ethylene oxide equivalent to 10–20% by weight of ethylene oxide units calculated on the total amount of alkylene oxide units in the final polyol. Further the present invention is concerned with isocyanate-reactive compositions comprising such a polyol, preferably in an amount of at least 10%, most preferably at least 20% by weight calculated on the isocyanate-reactive compounds in said composition excluding water in this calculation if present.

Further the present invention is concerned with a process for preparing a flexible polyurethane foam by reacting a polyisocyanate, an isocyanate-reactive composition comprising a polyether polyol comprising as alkylene oxide units ethylene oxide units (EO) and propylene oxide units (PO), said polyol having a nominal average hydroxyl functionality of 2–6, preferably 2–4 and most preferably 3, a hydroxyl value of 16–45 mg KOH/g, preferably 16–40 mg KOH/g, a primary hydroxyl content of at least 50% calculated on the total amount of hydroxyl groups and an ethylene oxide content of 21–49 and preferably of 21–35% by weight calculated on the weight of the alkylene oxide units in the polyol, this polyether polyol preferably being selected from the polyols described above, and 4.5–15, preferably 4.5–10 parts by weight of water per 100 parts by weight of other isocyanate-reactive compounds at an isocyanate index of 70–110, preferably of 75–105. Most preferably the polyether polyol and she isocyanate-reactive composition described in the previous paragraph are used in this process for preparing flexible foams although polyols having another EO/PO distribution may be used as well.

By the process according to the present invention a flexible foam is obtained having a good combination of physical properties together with good processing properties: the flexible foam has a low density, a satisfactory level of cell opening and a good stability while at the same time the reaction between the ingredients is sufficiently slow to provide good flow and easy processing on the mixing machine. In addition it was found that mixtures of the polyol according to the invention and the water used show a lower viscosity than such mixtures with polyols having EO in the tip only at equal EO level. Further foams made from the polyols according to the present invention showed improved resilience vis-à-vis foams made from polyols having no initial PO-block.

The polyols according to the present invention are made by methods known per se. An active hydrogen containing initiator is first propoxylated under conditions known per se followed by an ethoxylation/propoxylation and finally an ethoxylation both under conditions known per se as well. In the examples below a detailed process has been described for obtaining a polyol according to the present invention. Those skilled in the art will be able to prepare similar polyols according to the present invention easily in the light of the teaching of that example.

Suitable initiators for preparing the polyol according to the present invention include water, ethylene glycol, propylene glycol, butanediol, hexanediol, glycerol, trimethylol propane, pentaerythritol, hexanetriol, hydroquinone, resorcinol, catechol, bisphenols, ammonia, ethylenediamine, diamino-propanes, diaminobutanes, diaminopentanes, diamino-hexanes, ethanolamine, diethanolamine, triethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenyl-methane, sucrose and sorbitol.

Preferably those initiators are used which have 2–4 and most preferably 3 active hydrogen atoms in particular glycerol and trimethylol propane.

There is a certain trend in the art to use polyols having a low content of so called unsaturation. The polyol according to the present invention may also have a low unsaturation content.

The flexible foam is prepared by reacting a polyisocyanate, an isocyanate-reactive composition as indicated above and water under the above indicated conditions. The foams may be prepared according to the one-shot or the semi-prepolymer process. Preferably the semi-prepolymer process is applied.

In the one-shot process the isocyanate-reactive composition, the water and the polyisocyanate are reacted in one step. In the semi-prepolymer process some of the isocyanate-reactive compounds are pre-reacted with the polyisocyanate followed by reacting the semi-prepolymer so obtained with the water and the remaining isocyanate-reactive compound. In calculating the amount of water vis-à-vis the amount of the isocyanate-reactive compounds used, the isocyanate-reactive compounds used in preparing the semi-prepolymers are not taken into account.

In accordance with a certain trend in the art, the expression "polyurethane foam" as used herein generally refers to cellular products as obtained by reacting polyisocyanates with isocyanate-reactive hydrogen containing compounds, in the presence of foaming agents, and in particular includes cellular products obtained with water as reactive foaming agent (involving a reaction of water with isocyanate groups yielding urea linkages and carbon dioxide).

The expressions "isocyanate-reactive hydrogen containing compounds" or "isocyanate-reactive compounds" as used herein are furthermore intended to include polyols as well as polyamines. The expression "polyurethane foam" is thus intended also to include products which comprise urethane linkages together with urea linkages.

The expression "flexible polyurethane foam" as used herein refers to cellular products which exhibit substantial shape recovery after deformation.

The expressions "polymethylene polyphenylene polyisocyanates" and "MDI" as used herein refer to polyisocyanates selected from diphenylmethane diisocyanate isomers in particular diphenylmethane-4,4'-diisocyanate and mixtures thereof with other isomers, especially mixtures of 4,4'-MDI and 2,4'-MDI containing at least 40% by weight of 4,4'-MDI, polyphenyl polymethylene polyisocyanates having an isocyanate functionality above 2 and derivatives thereof bearing at least two isocyanate groups and containing carbodiimide groups, uretonimine groups, isocyanurate groups, urethane groups, allophanate groups, urea groups or biuret groups. They are obtainable by condensing aniline with formaldehyde, followed by phosgenation, which process yields what is called crude MDI, by fractionation of said crude MDI, which process yields pure MDI and polymeric MDI, and by autocondensation of crude, pure or polymeric MDI giving MDI comprising carbodiimide, uretonimine or isocyanurate groups, or reaction of excess of crude, pure or polymeric MDI with low or high molecular weight polyols or polyamines, which processes yield modified MDI, containing respectively urethane or allophanate groups and urea or biuret groups.

The expressions "isocyanate index" and "NCO-index" as used herein refer to the ratio of —NCO groups over the NCO-reactive hydrogen atoms present in a polyurethane formulation, given as a percentage:

$$NCO\text{-index} = \frac{[NCO]}{[\text{active hydrogen}]} \times 100.$$

In other words the NCO-index expresses the percentage of isocyanate actually used in a formulation with respect to the amount of isocyanate reactive hydrogen used in a formulation.

The expression "active hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index one hydroxyl group is considered to comprise one reactive hydrogen, one primary amine group is considered to comprise two reactive hydrogens and one water molecule is considered to comprise two active hydrogens.

It should be observed that the isocyanate index as used herein is considered from the point of view of the actual foaming process involving the MDI ingredient, the polyol and/or polyamine ingredient and the water, regarded as a one shot system. Any isocyanate groups consumed in a preliminary step to produce modified MDI (including such MDI-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free active hydrogens (including those of the water) present at the actual foaming process are taken into account.

The polyisocyanate may be selected from any polyisocyanate used in preparing flexible foams like toluene diisocyanates and in particular polymethylene polyphenylene polyisocyanates (MDI).

In case MDI semi-prepolymers are employed such semi-prepolymers preferably have an NCO value of at least 20% by weight.

The NCO-functionality of the used MDI preferably ranges from 1.9 to 2.9 and most preferably from 2 to 2.5 and most preferably from 2 to 2.3.

The isocyanate-reactive composition contains the polyol having an ethylene oxide (EO) content of 21–49% by weight preferably in an amount of at least 10% by weight, most preferably at least 20% by weight calculated on the weight of the isocyanate-reactive compounds in the composition excluding water in this calculation. Further the isocyanate-reactive composition may contain up to 90% by weight of other high molecular weight isocyanate-reactive hydrogen containing compounds (calculated at the same basis) selected from polyols and polyamines with an average nominal functionality of 2–6, preferably 2–3, and a number average equivalent weight ranging from 750–5000, preferably from 1000 to 3000.

Suitable polyols which can be employed include for example those polyether and polyester polyols which have an average nominal hydroxyl functionality from 2 to 6, and preferably from 2 to 3, and a number average hydroxyl equivalent weight of from 750 to 5000 preferably from 1000 to 3000 and most preferably from 1000 to 2500.

Further polyols which may be employed include for example polythioethers, polyacetals, polycarbonates and polyesteramides comprising from 2 to 6, and prefer from 2 to 3 hydroxyl groups.

Suitable polyamines which can be employed include for example those polyether polyamines which have an average nominal amine functionality from 2 to 6, and preferably from 2 to 3, and a number average equivalent weight from 750 to 5000, preferably from 1000 to 3000 and most preferably from 1000 to 2500.

Suitable polyether polyols which can be employed include those which are prepared by reacting one or more alkylene oxides or substituted alkylene oxides with one or more active hydrogen containing initiator compounds. Such oxides include for example ethylene oxide, propylene oxide, tetrahydrofuran, butylene oxides, styrene oxide, epichlorhydrin and epibromhydrin.

Suitable initiator compounds include, for example, water, ethylene glycol, propylene glycol, butane diol, hexane diol, glycerol, trimethylol propane, pentaerythritol, hexanetriol, hydroquinone, resorcinol, catechol, bisphenols, sucrose and sorbitol.

Further suitable initiators include, for example, ammonia, ethylenediamine, diaminopropanes, diaminobutanes, diamino-pentanes, diaminohexanes, ethanolamine, diethanolamine, triethanolamine, aminoethylethanolamine, aniline, 2,4-toluenediamine, 2,6-toluenediamine, 2,4'-di-amino-diphenylmethane, 4,4'-diaminodiphenylmethane, 1,3-phenylene-diamine, 1,4-phenylenediamine, naphthylene-1,5-diamine, 4,4'-di-(methylamino)-diphenylmethane, 1-methyl-2-methylamino-4-amino-benzene, 1,3-diethyl-2, 4diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane.

Suitable polyester polyols which can be employed include, for example, those prepared by reacting one or more polycarboxylic acids or anhydrides or esters thereof with one or more polyhydric alcohols. The polycarboxylic acids may be aliphatic, cyctoaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, terephthalic acid, and the like.

Examples of suitable polyhydric alcohols include ethylene glycol; 1,2-propylene glycol; 1,3-propylene glycol, butylene glycols; 1,6-hexane diol; 1,8-octane diol; neopentyl glycol; cyclohexane dimethanol (1,4-bishydroxymethyl cyclohexane); 2-methyl-1,3-propane diol; glycerol; trimethylol propane; 1,2,6-hexane triol; 1,2,4-butane triol; trimethylol ethane; pentaerythritol; quinitol; diethylene glycol; triethylene glycol; tetraethylene glycol; polyethylene glycol; dipropylene glycol; polypropylene glycols; dibutylene glycol; or polybutylene glycols. In is also possible to use polyesters of lactones such as caprolactone, or hydroxy carboxylic acids such as hydroxy caproic acid.

Suitable polyether polyamines which can be employed include those which are prepared by amination of polyether polyols of the type described above.

For use in accordance with the invention it is not necessary that the amination of the polyols is complete. Partially aminated polyether polyols of the type disclosed above can also be employed.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polycondensation reaction (for instance between polyisocanates and amino-functional compounds) or a polycondensation reaction (for instance between formaldehyde and phenols and/or amines) in situ in such polyols as already disclosed above. Suitable are also polyhydroxyl derivatives modified by vinylpolymerisation, such as for example obtained by polymerising styrene and acrylonitrile in the presence of polyether polyols or polycarbonate polyols.

As stated above the process according to the invention may be carried out according to the semi-prepolymer technique. In order to prepare such a prepolymer the polyisocyanate and a part or all of the polyol is pre-reacted before the foaming takes place, under conditions known per se. Reaction temperatures of about 40° C. to about 90° C. are generally suitable for the preparation of urethane group-containing semi-prepolymers from polyols or urea group-containing semi-prepolymers from polyamines but, if desired, the reaction may be continued under known conditions so as to convert urethane groups to allophanate groups and urea groups to biuret groups.

The isocyanate-reactive composition further may comprise up to 25% by weight of chain extenders calculated on the weight of the isocyanate-reactive compounds in the composition excluding water in this calculation. Such chain extenders may be selected from those having 2-6 isocyanate-reactive groups and having a molecular weight of 60–1000 and preferably 60–500, like ethylene glycol, diethylene glycol, propylene glycol, dipropylene glycol, glycerol, 1,4-butane diol, diethylene diamine, ethanolamine, diethanolamine, triethanolamine, toluene diamine, diaminodiphenylmethane, diethyltoluene diamine (DETDA), isophorone diamine and diamino polyols like Mannich derivatives of alkyl phenols or phenols.

The process for preparing the flexible foams may be conducted in the presence of additives known per se like flame retardants, catalysts, blowing agents, surfactants, fillers and fibrous reinforcements as more in particular reported in chapter 2 of the ICI Polyurethanes Handbook by G. Woods. Such additives conveniently may be combined with the polyisocyanate and preferably the isocyanate-reactive composition before the foaming takes place.

Although other blowing agents than water, like chlorofluorocarbons and hydrogenchlorofluorocarbons, may be used, preferably water is used as the only blowing agent. The water preferably is premixed with the isocyanate-reactive composition.

The flexible foams may be made according to the moulding or the slabstock technique. The foams may be used in the furniture and automotive industries in seating, cushioning and mattresses, especially in Waterlilly comfort cushioning, Waterlilly is a trade mark of Imperial Chemical Industries PLC. The flexible foams obtained may have a free rise density of as low as 20 to 35 kg/m$^3$.

The present invention is illustrated by the following examples.

EXAMPLE 1

46 parts by weight (pbw) glycerol and 0.72 pbw of an aqueous solution of 50% w of KOH were added to an autoclave which was subsequently three times purged with $N_2$ and then vacuum stripped at 110° C. for 1½ hours to remove the water. Then propylene oxide was added and allowed to react at 110° C. followed by vacuum stripping. At this stage the hydroxyl value of the polyol was 422 mg KOH/g. To 23 pbw of this polyol 2.58 pbw of an aqueous solution of 50% w of KOH was added, followed by vacuum stripping at 110° C. for 2 hours. Then 248.5 pbw of propylene oxide was added over a period of 14 hours at 110° C.; the reaction was continued for another 3 hours followed by vacuum stripping for 1 hour. Of the polyol so obtained 121.5 pbw was removed from the reactor. To the remainder 90 pbw of a 40/60 w/w mixture of ethylene oxide and propylene oxide was added over a period of 7½ hours at 110° C. and allowed to react for another 3 hours followed by vacuum stripping at 110° C. for 1½ hours. Then 41.5 pbw of ethylene oxide was added at 120° C. and allowed to react for 1 hour at 125° C. followed by vacuum stripping for 1 hour at 110° C. Then 2% w of magnesium silicate was added at 110° C. followed by filtration of the polyol at 110° C. for 8 hours. The polyol obtained has an $OH_v$ of 20 mg KOH/g, an EO content of 26% by weight, an EO-tip amount of 15% by weight, a primary hydroxyl content of 91% and a PO block linked to the initiator of 53% by weight relative to the total amount of EO and PO units in the polyol.

EXAMPLE 2

In a similar way as in Example 1 a polyol was prepared by reacting glycerol and ethylene oxide and propylene oxide giving a polyol having an $OH_v$=28 mg KOH/g, a primary hydroxyl content of 85–95%, an ethylene oxide content of 29% by weight, an EO-tip amount of 15% by weight and a PO block linked to the initiator of 55% by weight relative to the total amount of EO and PO units in the polyol.

EXAMPLE 3

The above polyols were used to prepare flexible foams by mixing these polyols with other ingredients to form a polyol composition and to react this with a polyisocyanate in an open container. The relative amounts (in parts by weight) of the ingredients, the index and physical date are given in Table 1.

TABLE 1

| Experiment | 1 | 2 | 3 | 4 | 5 | 6 | 7 | 8 | 9 | 10 | 11 |
|---|---|---|---|---|---|---|---|---|---|---|---|
| Polyol Composition | | | | | | | | | | | |
| Polyol from Ex. 1 | 100 | 100 | 100 | 100 | 100 | 100 | — | — | — | — | — |
| Polyol from Ex. 2 | — | — | — | — | — | — | 100 | 100 | 100 | 100 | 100 |
| Polyol 3 | — | — | — | — | — | — | — | — | — | 100 | — |
| Polyol 4 | — | — | — | — | — | — | — | — | — | — | 100 |
| Water | 4 | 6 | 4 | 6 | 4 | 6 | 6 | 6 | 6 | 6 | 6 |
| Niax A1 | 0.15 | 0.15 | 0.15 | 0.15 | 0.15 | 0.15 | 0.1 | 0.15 | 0.2 | 0.1 | 0.13 |
| D 33 LV | 0.7 | 0.7 | 0.7 | 0.7 | 0.7 | 0.7 | — | — | — | — | — |
| B 4113 | 1 | 1 | 1 | 1 | 1 | 1 | — | — | — | — | — |
| X 8154 | — | — | — | — | — | — | 0.5 | 0.5 | 0.5 | 2 | 1 |
| Index | 60 | 60 | 75 | 75 | 90 | 90 | 90 | 90 | 90 | 90 | 90 |
| End of rise, sec | 94 | 90 | 95 | 77 | 85 | 80 | 112 | 92 | 78 | 82 | 119 |
| Recession, % | 0 | 1 | 0 | 5 | 1 | 2 | 0 | 0 | 0 | 15 | 0 |
| Free rise density, Kg/m$^3$ | ND | ND | ND | 32.5 | 40 | 28.5 | 24.5 | 27 | 26 | 37 | ND |
| Cell open/closed | 3 | 3 | 3 | 1 | 2 | 1 | 1 | 1 | 1 | ND | 3 |
| CLD, 40% (KPa) | ND | ND | ND | 4.5 | 5.5 | 4.7 | 3.8 | 4.6 | 4.4 | ND | ND |

Remarks
$^1$The polyisocyanate is an MDI-based prepolymer having an NCO content of 27.9 prepared by reacting MDI (2.4' MDI content of 30% w) and a trifunctional EO/PO polyol, with 75% w EO random, and a MW of 4000 to obtain a 27.0 NCO polyisocyanate and mixing this with polymeric MDI.
$^2$X 8154: catalyst obtainable from Air Products
D 33 LV: catalyst obtainable from Air Products
B 4113: Tegostab B 4113, surfactant obtainable from Goldschmidt
Niax A1: catalyst obtainable from Union Carbide
Polyol 3: a glycerol based EO/PO polyol of MW 4800 and 17% w EO (all-tip).
Polyol 4: a glycerol based EO/PO poyol of MW 4000 and 75% w EO (random).
$^3$ND = not determined
$^4$Cell open/closed:
1 = good cell opening, no crushing needed.
2 = acceptable cell opening but crushing needed.
3 = inferior cell-opening; not crushable; not acceptable.
The free rise density was determined by the ISO R1855 method.
CLD, 40% was determined according to the ISO 3386 method.
The end of rise time is determined as described in "33rd Annual Polyurethane Technical/Marketing Conference of 30.9–3.10.90, pages 297–305 by S. Burks et al" with the proviso that the time necessary for the rise profile to reach a level which is 98% of its maximal height is regarded as the end of rise time.
The recession is determined by measuring the maximum height the foam is reaching and the final height of the foam 5 minutes after the reaction mixture was mixed and calculating the recession from the formula $$\frac{\text{maximum height} - \text{final height}}{\text{maximum height}} \times 100\%$$

$^5$Experiments 1–3, , 5, 10 and 11 are comparative. At low index the cell opening is unacceptably low. At a higher index but a low water level the cell opening is improved but the density is relatively high. In experiments 4 and 6–9 flexible foams are obtained which show a low free rise density, a good cell-opening (no crushing required), a good stability (low recession), and a sufficiently long end of rise time which allows good flow together with easy processing on the mixing machine.
Experiment 10 shows that a polyol with EO-tip only leads to an increased recession and experiment 11 shows that high amounts of polyols having high amounts of EO lead to foams which are inferior regarding cell-opening.

EXAMPLE 4

Mixtures were made of 9 parts by weight of water and 100 parts by weight of respectively the polyol obtained in example 2 (polyol A) and a glycerol-based EO/PO polyol having OH value=28 mg KOH/g and 28% w of EO (all tipped) (polyol B). The mixtures were made by standard mixing at ambient conditions for 5 minutes. The viscosities of polyol A, polyol B, the mixture with polyol A and the mixture with polyol B were 1100, 1600, 2800 and 6700 mPa.sec respectively (measured at Brookfield viscosimeter at 25° C.).

We claim:

1. Polyether polyol comprising as alkylene oxide units ethylene oxide and propylene oxide units, said polyol having a nominal average hydroxyl functionality of 2–6, an hydroxyl value of 16–45 mg KOH/g, a primary hydroxyl content of at least 50% calculated on the total amount of hydroxyl groups, an amount of ethylene oxide units, calculated on the weight of the alkylene oxide units in the polyol, of 21–49% by weight and which polyol has been prepared by reacting an initiator and an amount of propylene oxide equivalent to 20–75% by weight of propylene oxide units calculated on the total amount of alkylene oxide units in the final polyol, followed by reaction of the polyol so obtained with a mixture of ethylene oxide and propylene oxide, followed by reaction of the polyol so obtained with an amount of ethylene oxide equivalent to 10–20% by weight of ethylene oxide units calculated on the total amount of alkylene oxide units in the final polyol.

2. Isocyanate-reactive composition comprising a polyol according to claim 1 in an amount of at least 10% by weight and up to 90% by weight of a high molecular weight isocyanate-reactive hydrogen containing compound selected from the group consisting of polyols and polyamines having an average nominal functionality of 2 to 6 and a number average equivalent weight of 750 to 5,000.

\* \* \* \* \*